US012651561B2

(12) United States Patent
Kang et al.

(10) Patent No.: US 12,651,561 B2
(45) Date of Patent: Jun. 9, 2026

(54) DISPLAY DEVICE

(71) Applicant: Samsung Display Co., Ltd., Yongin-si (KR)

(72) Inventors: Min Kang, Yongin-si (KR); Jae Won Kim, Yongin-si (KR); Hyung Jun Park, Yongin-si (KR); Hyun Ji Cha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/084,290

(22) Filed: Mar. 19, 2025

(65) Prior Publication Data

US 2025/0372028 A1 Dec. 4, 2025

(30) Foreign Application Priority Data

May 28, 2024 (KR) ........................ 10-2024-0069292

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2300/0426* (2013.01); *G09G 2300/0819* (2013.01); *G09G 2310/0267* (2013.01); *G09G 2330/021* (2013.01)

(58) Field of Classification Search
CPC ......... G09G 3/3266; G09G 2300/0426; G09G 2300/0819; G09G 2310/0267; G09G 2330/021
See application file for complete search history.

(56) References Cited

U.S. PATENT DOCUMENTS 7,652,649 B2 * 1/2010 Huang ................. G09G 3/3648 345/98
2014/0111490 A1 * 4/2014 Lee ........................ G11C 19/28 345/204
2014/0300649 A1 * 10/2014 Park ..................... G09G 3/3208 345/690
2015/0302792 A1 * 10/2015 Lu ........................... G09G 3/32 315/294
(Continued)

FOREIGN PATENT DOCUMENTS

KR 20150066313 A 6/2015
KR 20190079487 A 7/2019
(Continued)

*Primary Examiner* — Sejoon Ahn
(74) *Attorney, Agent, or Firm* — CANTOR COLBURN LLP

(57) ABSTRACT

Provided is a display device including a first display area including a pixel circuit and a scan line configured to provide a scan signal to the pixel circuit of the first display area. The display device includes a second display area located at a side of the first display area and including a pixel circuit and a scan line configured to provide a scan signal to the pixel circuit of the second display area. The display device includes a first scan driver located at a first side edge of the first display area, a second scan driver located at a second side edge of the first display area, a third scan driver located at a first side edge of the second display area, and a fourth scan driver located at a second side edge of the second display area.

20 Claims, 10 Drawing Sheets

(56) References Cited

U.S. PATENT DOCUMENTS

| | | | | |
|---|---|---|---|---|
| 2022/0375401 | A1* | 11/2022 | Kim | G09G 3/2085 |
| 2023/0137600 | A1* | 5/2023 | Koh | G09G 3/3266<br>345/691 |
| 2023/0145644 | A1* | 5/2023 | Shin | G09G 3/3233<br>345/212 |
| 2023/0186854 | A1* | 6/2023 | Yoon | G09G 3/3266<br>345/694 |
| 2023/0196999 | A1* | 6/2023 | Cho | G09G 3/3275 |

FOREIGN PATENT DOCUMENTS

| | | | |
|---|---|---|---|
| KR | 20210086316 | A | 7/2021 |
| KR | 20220034952 | A | 3/2022 |

* cited by examiner

BML: CNE1
ACTL1: SDE, SACT, SSE
GTL1: SGE
GTL2: CPE
ACTL2: DE, ACT, SE
GTL3: GE, SL
SDL1: ANE1, CNE2
SDL2: ANE2

DISPLAY DEVICE

This application claims priority to Korean Patent Application No. 10-2024-0069292, filed on May 28, 2024, and all the benefits accruing therefrom under 35 U.S.C. § 119, the content of which in its entirety is herein incorporated by reference.

BACKGROUND

1. Field of the Disclosure

Embodiments of the present disclosure relate to a display device.

2. Description of the Related Art

As the information-oriented society evolves, various demands for display devices are ever increasing. For example, display devices are being employed by a variety of electronic devices such as, for example, smart phones, digital cameras, laptop computers, navigation devices, and smart televisions. A display device, in which each of the pixels of the display panel includes a light-emitting element that can emit light by itself, can display images without a backlight unit that supplies light to the display panel.

In some cases, the display device may include a plurality of pixels, data lines and gate lines connected to the plurality of pixels, a data driver that supplies data voltages to the data lines, and a scan driver that supplies scan signals to the gate lines. The data driver and the scan driver may drive the plurality of pixels at a predetermined frequency.

SUMMARY

Embodiments supported by aspects of the present disclosure provide a display device that can reduce the load for outputting scan signals and reduce the size of the non-display area.

An embodiment supported by aspects of the present disclosure provides a display device including a first display area comprising a pixel circuit and a scan line for providing a scan signal to the pixel circuit, a second display area located at a side of the first display area and comprising a pixel circuit and a scan line for providing a scan signal to the pixel circuit, a first scan driver located at a first side edge of the first display area, overlapping with the pixel circuit, and electrically connected to a first side of the scan line of the first display area, a second scan driver located at a second side edge opposite to the first side edge of the first display area, overlapping with the pixel circuit, and electrically connected to a second side of the scan line of the first display area opposite to the first side, a third scan driver located at a first side edge of the second display area, overlapping with the pixel circuit, and electrically connected to a first side of the scan line of the second display area, and a fourth scan driver located at a second side edge opposite to the first side edge of the second display area, overlapping with the pixel circuit, and electrically connected to a second side of the scan line of the second display area opposite to the first side.

In an embodiment, the display device may further include a first connection line electrically connecting the first scan driver and the first side of the scan line of the first display area, a second connection line electrically connecting the second scan driver and the second side of the scan line of the first display area, a third connection line electrically connecting the third scan driver and the first side of the scan line of the second display area, and a fourth connection line electrically connecting the fourth scan driver and the second side of the scan line of the second display area.

The second and third connection lines may be disposed between the pixel circuit of the first display area and the pixel circuit of the second display area. The second and third connection lines do not overlap with the pixel circuits of the first and second display areas.

The first connection line may be closer to the first side edge of the first display area than the first scan driver, the second connection line may be closer to the second side edge of the first display area than the second scan driver, the third connection line may be closer to the first side edge of the second display area than the third scan driver, and the fourth connection line may be closer to the second side edge of the second display area than the fourth scan driver.

The display device may further include a boundary line disposed between the first and second display areas to separate the first and second display areas from each other. The pixel circuit of the first display area and the pixel circuit of the second display area may be spaced apart from each other with the boundary line therebetween.

The second connection line may be disposed between the boundary line and the pixel circuit of the first display area and may not overlap with the pixel circuit of the first display area, The third connection line may be disposed between the boundary line and the pixel circuit of the second display area and may not overlap with the pixel circuit of the second display area.

Each of the first to fourth scan drivers may include a scan transistor disposed in a first active layer including a first material, and the pixel circuit may include a transistor disposed in a second active layer including a second material different from the first material.

The display device may further include a first active layer including a semiconductor region of the scan transistor, a first gate layer disposed on the first active layer and including a gate electrode of the scan transistor, a second gate layer disposed on the first gate layer, a second active layer disposed on the second gate layer and including a semiconductor region of the transistor, and a third gate layer disposed on the second active layer and including a gate electrode of the transistor and the scan line.

The display device may further include a first source metal layer disposed on the third gate layer. The first source metal layer may include a connection electrode that electrically connects the scan transistor with the scan line.

The display device may further include a first active layer including a semiconductor region of a transistor of the pixel circuit, a first gate layer disposed on the first active layer and including a gate electrode of the transistor and the scan line, a second gate layer disposed on the first gate layer, a second active layer disposed on the second gate layer and including a semiconductor region of a scan transistor of each of the first to fourth scan drivers, and a third gate layer disposed on the second active layer and including the gate electrode of the scan transistor.

The display device may further include a first source metal layer disposed on the third gate layer. The first source metal layer may include a connection electrode that electrically connects the scan transistor with the scan line.

The pixel circuit may include a first transistor configured to supply a driving current to a light-emitting element, a second transistor configured to supply a data voltage to a gate electrode of the first transistor, a third transistor configured to supply a reference voltage to the gate electrode of the first transistor, a fourth transistor configured to supply an initialization voltage to a first electrode of the light-emitting element, a fifth transistor configured to supply a driving voltage to a first electrode of the first transistor, and a sixth transistor configured to electrically connect a second electrode of the first transistor and the first electrode of the light-emitting element.

The pixel circuit may include a first transistor configured to supply a driving current to a light-emitting element, a second transistor configured to supply a data voltage to a first electrode of the first transistor, a third transistor configured to electrically connect a second electrode of the first transistor and a gate electrode of the first transistor, a fourth transistor configured to supply a first initialization voltage to the gate electrode of the first transistor, a fifth transistor configured to supply a driving voltage to the first electrode of the first transistor, a sixth transistor configured to electrically connect the second electrode of the first transistor and a first electrode of the light-emitting element, and a seventh transistor configured to supply a second initialization voltage to the first electrode of the light-emitting element.

An embodiment supported by aspects of the present disclosure provides a display device including a display area comprising a pixel circuit, a scan line extended in a first direction to supply a scan signal to the pixel circuit, and a boundary line extended in a second direction intersecting the first direction and passing through a center, a first display area located at a first side of the boundary line in the display area, a second display area located at a second side of the display area opposite to the first side of the boundary line, a first scan driver located at a first side edge of the display area and electrically connected to a first side of the scan line in the first display area, a second scan driver located at the first side of the boundary line and electrically connected to a second side opposite to the first side of the scan line in the first display area, a third scan driver located at a second side opposite to the first side of the boundary line and electrically connected to a first side of the scan line in the second display area, and a fourth scan driver located at a second side edge opposite to the first side edge of the display area and electrically connected to a second side opposite to the first side of the scan line in the second display area.

The first and second scan drivers may overlap with the pixel circuit of the first display area. The third and fourth scan drivers may overlap with the pixel circuit of the second display area.

The display device may further include a first connection line electrically connecting the first scan driver and the first side of the scan line of the first display area, a second connection line electrically connecting the second scan driver and the second side of the scan line of the first display area, a third connection line electrically connecting the third scan driver and the first side of the scan line of the second display area, and a fourth connection line electrically connecting the fourth scan driver and the second side of the scan line of the second display area.

The second and third connection lines may be disposed between the pixel circuit of the first display area and the pixel circuit of the second display area. The second and third connection lines may not overlap with the pixel circuits of the first and second display areas.

The first connection line may be closer to the first side edge of the display area than the first scan driver. The second connection line may be closer to the boundary line than the second scan driver. The third connection line may be closer to the boundary line than the third scan driver. The fourth connection line may be closer to the second side edge of the display area than the fourth scan driver.

The first to fourth scan drivers may include a scan transistor disposed in a first active layer including a silicon-based material. The pixel circuit may include a transistor disposed in a second active layer including an oxide-based material.

The pixel circuit may include a scan transistor disposed in a first active layer including a silicon-based material. Each of the first to fourth scan drivers circuit may include a transistor disposed in a second active layer including an oxide-based material.

In embodiments according to aspects of the present disclosure, first and second scan drivers are arranged on the both edges of a first display area to supply scan signals, and third and fourth scan drivers are arranged on both edges of a second display area to supply scan signals in a display device, thereby reducing the load for outputting scan signals and the size of the non-display area.

BRIEF DESCRIPTION OF THE DRAWINGS

These and/or other features supported by aspects of the present disclosure will become apparent and more readily appreciated from the following description of the embodiments, taken in conjunction with the accompanying drawings, in which.

DETAILED DESCRIPTION

Figure 1:
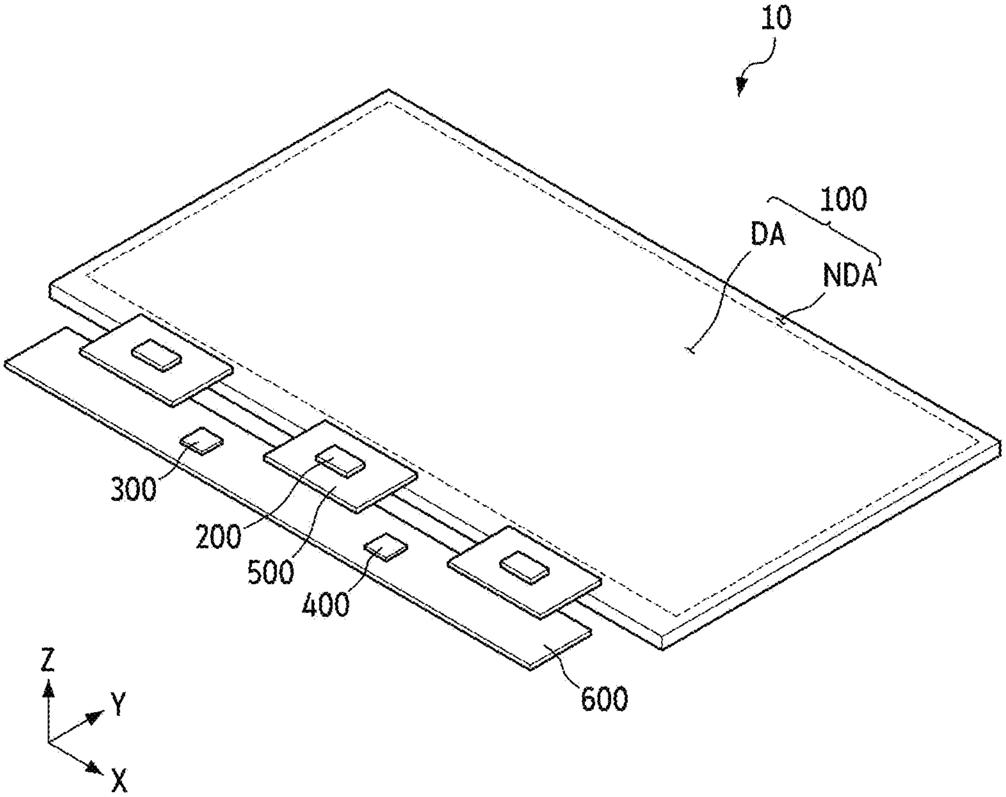
FIG. 1 is a perspective view illustrating a display device according to an embodiment of the present disclosure.

Embodiments of the present disclosure will now be described more fully hereinafter with reference to the accompanying drawings, in which various embodiments of the present disclosure are illustrated. Aspects supported by the present disclosure, however, may be embodied in different forms and should not be construed as limited to the embodiments set forth herein. Rather, the example embodiments are provided such that this disclosure will be thorough and complete, and will fully convey the scope of example aspects of the present disclosure to those skilled in the art. The same reference numbers indicate the same components throughout the specification. In the attached drawing figures, the thickness of layers and regions is exaggerated for clarity.

It will be understood that, although the terms “first,” “second,” “third,” and the like may be used herein to describe various elements, components, regions, layers and/or sections, these elements, components, regions, layers and/or sections should not be limited by these terms. These terms are used to distinguish one element, component, region, layer or section from another element, component, region, layer or section. Thus, “a first element,” “component,” “region,” “layer” or “section” discussed below could be termed a second element, component, region, layer or section without departing from the teachings herein.

It will also be understood that when a layer is referred to as being “on” another layer or substrate, it can be directly on the other layer or substrate, or intervening layers may also be present. In contrast, when an element is referred to as being “directly on” another element, there are no intervening elements present.

The terminology used herein is for the purpose of describing particular embodiments and is not intended to be limiting. As used herein, the singular forms “a,” “an,” and “the” are intended to include the plural forms, including “at least one,” unless the content clearly indicates otherwise. Thus, reference to “an” element in a claim followed by reference to “the” element is inclusive of one element and a plurality of the elements. For example, “an element” has the same meaning as “at least one element,” unless the context clearly indicates otherwise. “At least one” is not to be construed as limiting “a” or “an.” “Or” means “and/or.” “At least one of A and B” or “at least one selected from A and B” means “A and/or B.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as, for example, “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. A region illustrated or described as flat may, typically, have rough and/or nonlinear features, for example. Moreover, sharp angles that are illustrated may be rounded. Thus, the regions illustrated in the drawing figures are schematic in nature and their shapes are not intended to illustrate the precise shape of a region and are not intended to limit the scope of the present claims.

Hereinafter, embodiments of the present disclosure will be described in detail with reference to the accompanying drawings.

FIG. 1 is a perspective view illustrating a display device according to an embodiment of the present disclosure.

Referring to FIG. 1, a display device 10 is for displaying moving images or still images. The display device 1 may be used as the display screen of portable electronic devices such as, for example, a mobile phone, a smart phone, a tablet PC, a smart watch, a watch phone, a mobile communications terminal, an electronic notebook, an electronic book, a portable multimedia player (PMP), a navigation device and a ultra mobile PC (UMPC), as well as the display screen of various products such as, for example, a television, a notebook, a monitor, a billboard and the Internet of Things.

The display device 10 may include a display panel 100, a data driver 200, a timing controller 300, a power supply unit 400, a data circuit board 500, and a control circuit board 600.

The display panel 100 may have a rectangular shape with longer sides in an x-axis direction and shorter sides in a y-axis direction that intersects the x-axis direction when viewed from the top. The corners where the longer sides in the x-axis direction and the shorter sides in the y-axis direction meet each other may be rounded with a predetermined curvature or may be formed at a right angle. The shape of the display panel 100 when viewed from the top is not limited to a quadrangular shape, but may be formed in a different polygonal shape, a circular shape, or an elliptical shape. The display panel 100 may be formed flat, but embodiments of the present disclosure are not limited thereto. For example, the display panel 100 may be formed at left and right ends, and may include a curved portion having a constant curvature or a varying curvature. The display panel 100 may be formed to be flexible such that the display panel 100 can be curved, bent, folded or rolled.

The display panel 100 may include a display area DA where images are displayed, and a non-display area NDA disposed around the display area DA. The display area DA may occupy most of the area of the display panel 100. The display area DA may be located at the center of the display panel 100. The display area DA may include a plurality of pixels for displaying images, and a scan driver.

Each of the plurality of pixels may include a light-emitting element that emits light. The light-emitting element may include, but is not limited to, at least one of: an organic light-emitting diode including an organic emissive layer, a quantum-dot light-emitting diode including a quantum-dot emissive layer, an inorganic light-emitting diode including an inorganic semiconductor, and a micro light-emitting diode (micro LED).

The scan driver may provide scan signals to the gate lines of the display area DA. The scan driver may be located at the center, on the left and right sides of the non-display area NDA, but embodiments of the present disclosure are not limited thereto.

The non-display area NDA may be disposed adjacent to the display area DA. The non-display area NDA may be located at the outer side of the display area DA. The non-display area NDA may surround the display area DA. The non-display area NDA may be defined as the border of the display panel 100.

The non-display area NDA may include fan-out lines and pads. The fan-out lines may electrically connect the data driver 200 with data lines in the display area DA. The pads may be electrically connected to the data circuit board 500. The pads may be disposed on the lower side of the display panel 100, but embodiments of the present disclosure are not limited thereto.

The data driver 200 may output signals and voltages for driving the display panel 100. The data driver 200 may provide data voltages to the data lines. The data driver 200 may provide a supply voltage to a supply voltage line, and may supply a scan control signal to the scan driver 800. The data driver 200 may be implemented as an integrated circuit (IC) and mounted on the data circuit board 500 by the chip-on-film (COF) technique. Alternatively, the data driver 200 may be mounted in the non-display area NDA of the display panel 100 by chip-on-glass (COG) technique, chip-on-plastic (COP) technique, or ultrasonic bonding.

The timing controller 300 may be mounted on the control circuit board 600 and may receive digital video data and a timing synchronization signal supplied from a display driving system or a graphic device through a user connector provided on the control circuit board 600. The timing controller 300 may coordinate digital video data appropriately for the pixel arrangement structure in response to a timing synchronization signal, and may supply the coordinated digital video data to the data driver 200. The timing controller 300 may generate a data control signal and a scan control signal based on the timing synchronization signal. The timing controller 300 may control the timing of applying the data voltages from the data driver 200 based on a data control signal, and may control the timing of providing the scan signals from the scan driver based on the scan control signal.

The power supply unit 400 may be mounted on the control circuit board 600 to apply a supply voltage to the display panel 100 and the data driver 200. For example, the power supply unit 400 may generate a driving voltage, a common voltage, an initialization voltage, a bias voltage, a gate-high voltage, a gate-low voltage, or a reference voltage. The power supply unit 400 may provide supply voltage to drive the plurality of pixels and the data driver 200.

The data circuit board 500 may be disposed on a pad located at one edge of the display panel 100. The data circuit board 500 may be attached to the pad using a conductive adhesive member such as, for example, an anisotropic conductive film. The data circuit board 500 may be electrically connected to signal lines of the display panel 100 through an anisotropic conductive film. The display panel 100 may receive the data voltage and the supply voltage through the data circuit board 500. For example, the data circuit board 500 may be a flexible printed circuit board (FPCB), a printed circuit board (PCB), or a flexible film such as, for example, a chip-on-film (COF).

The control circuit board 600 may be attached to the data circuit board 500 using a low-resistance, high-reliability material such as, for example, an anisotropic conductive film or a self-assembly anisotropic conductive paste (SAP). The control circuit board 600 may be electrically connected to the data circuit board 500. The control circuit board 600 may be a flexible printed circuit board or a printed circuit board.

Figure 2:
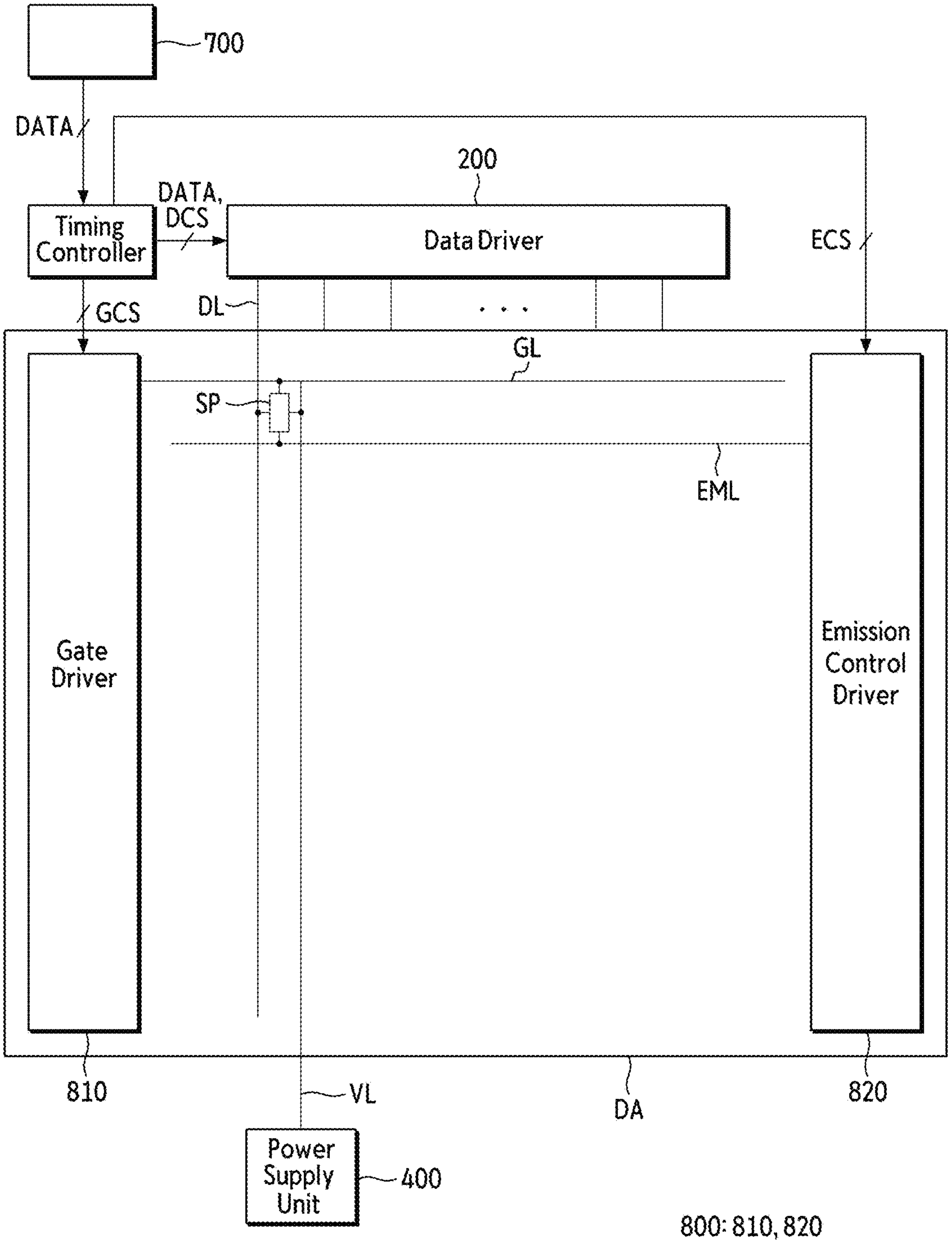
FIG. 2 is a block diagram illustrating a display device according to an embodiment of the present disclosure.

FIG. 2 is a block diagram illustrating a display device according to an embodiment of the present disclosure.

Referring to FIG. 2, a display panel 100 may include a display area DA and a non-display area NDA. The display area DA may include a pixel SP, a gate line GL, an emission control line EML, a data line DL, a voltage line VL, and a scan driver 800.

Each of the plurality of pixels SP may be connected to a gate line GL, a data line DL, an emission control line EML, and a voltage line VL. Each of the plurality of pixels SP may include at least one transistor, a light-emitting element, and a capacitor.

The gate lines GL may extend in the x-axis direction and may be spaced apart from one another in the y-axis direction crossing the x-axis direction. The gate lines GL may sequentially supply gate signals to the plurality of pixels SP.

The emission control lines EML may extend in the x-axis direction and may be spaced apart from each other in the y-axis direction. The emission control lines EML may sequentially supply emission signals to the pixels SP.

The data lines DL may extend in the y-axis direction and may be spaced apart from one another in the x-axis direction. The data lines DL may supply the data voltages received from the data driver 200 to the pixels SP. The data voltage may determine the brightness of each of the plurality of pixels SP.

The voltage lines VL may extend in the y-axis direction and may be spaced apart from one another in the x-axis direction. The voltage lines VL may supply voltage to the plurality of pixels SP. The supply voltage may include at least one of: a driving voltage, a common voltage, an initialization voltage, a bias voltage, a gate-high voltage, a gate-low voltage, and a reference voltage. For example, the driving voltage may be a high-level voltage for driving the light-emitting elements of the pixels SP, and the common voltage may be a low-level voltage for driving the light-emitting elements of the pixels SP.

The scan driver 800 may include a gate driver 810 and an emission control driver 820. The gate driver 810 may include a plurality of transistors for generating a gate signal based on the gate control signal GCS. The emission control driver 820 may include a plurality of transistors for generating an emission signal based on the emission control signal ECS. For example, the gate driver 810 and the emission control driver 820 may include transistors disposed in a first active layer including a first material, and the pixels SP may include transistors disposed in a second active layer including a second material different from the first material. The gate driver 810 may provide gate signals to the gate lines GL, and the emission control driver 820 may provide emission signals to the emission control lines EML.

The data driver 200 may convert the digital video data DATA into analog data voltages and may supply them to the data lines DL. The gate signals of the gate driver 810 may be used to select pixels SP to which data voltages are applied, and the selected pixels SP may receive the data voltages through the data lines DL.

The timing controller 300 may receive digital video data DATA and timing signals from a graphics device 700. For example, the graphics device 700 may be, but is not limited to, a graphics card of the display device 10. The timing controller 300 may generate a data control signal DCS based on timing signals and may provide digital video data DATA and the data control signal DCS to the data driver 200, thereby controlling the operation timing of the data driver 200. The timing controller 300 may control the operation timing of the gate driver 810 by generating a gate control signal GCS based on the timing signals and supplying the gate control signal GCS to the gate driver 810. The timing controller 300 may control the operation timing of the emission control driver 820 by generating an emission control signal ECS based on the timing signals and supplying the emission control signal ECS to the emission control driver 820. The timing controller 300 may vary the driving frequency of the display panel 100 based on the input frequency of digital video data DATA of the graphics device 700.

The power supply unit 400 may be disposed on the data circuit board 500 and provide a supply voltage to the data driver 200 and the display panel 100. The power supply unit 400 may generate a driving voltage and supply the driving voltage to a driving voltage line, and the power supply unit 400 may generate a common voltage and supply the common voltage to a common electrode shared by the light-emitting elements of pixels The power supply unit 400 may generate an initialization voltage and supply the initialization voltage to the initialization voltage line, and may generate a bias voltage and supply the bias voltage to the bias voltage line. The power supply unit 400 may generate a gate-high voltage and supply the gate-high voltage to a gate-high voltage line, may generate a gate-low voltage and supply the gate-low voltage to a gate-low voltage line, and may generate a reference voltage and supply the reference voltage to a reference voltage line.

Figure 3:
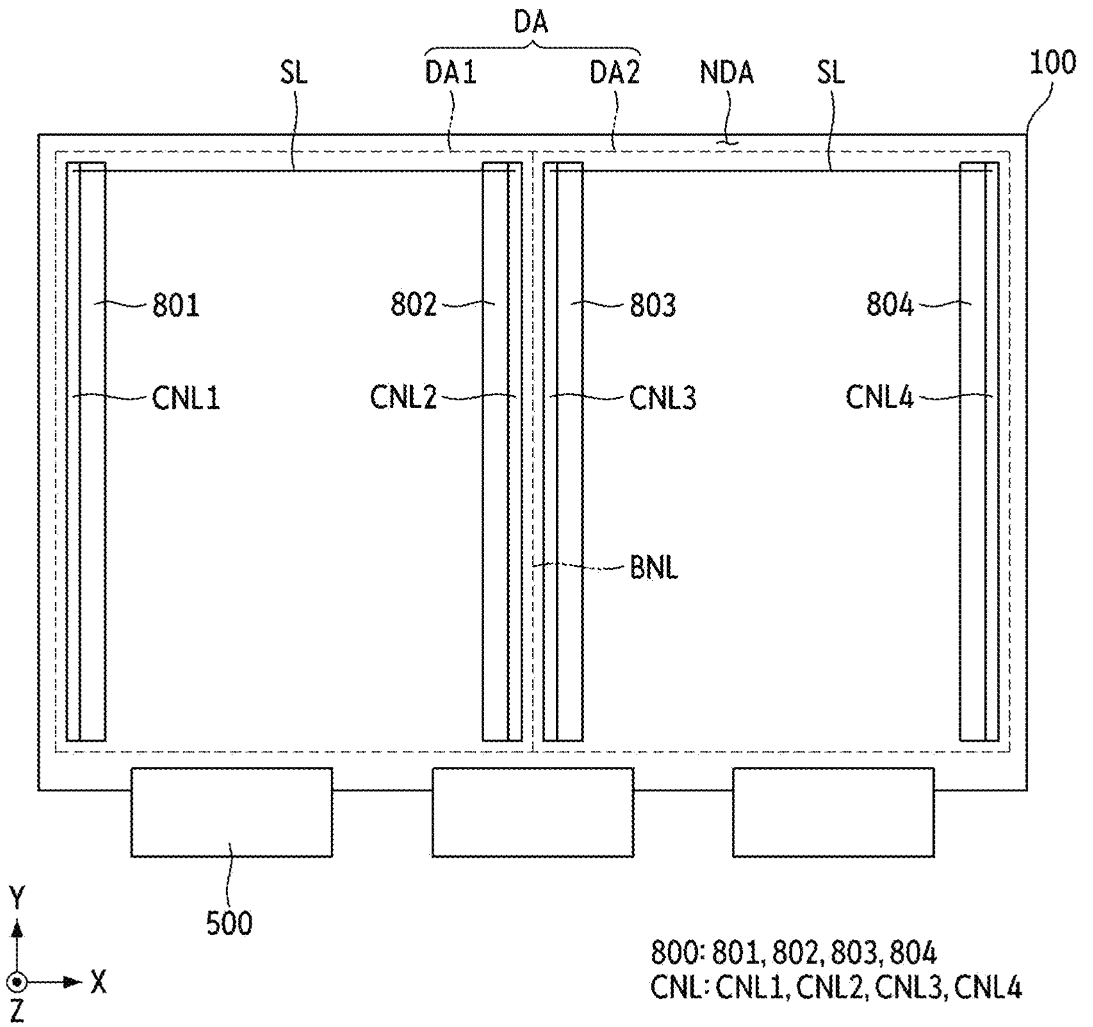
FIG. 3 is a plan view illustrating a display device according to an embodiment of the present disclosure.

FIG. 3 is a plan view illustrating a display device according to an embodiment of the present disclosure.

Referring to FIG. 3, the display area DA may include a first display area DA1 and a second display area DA2. The first display area DA1 may be a left portion of the display area DA, and the second display area DA2 may be a right portion of the display area DA. It should be understood, however, that the positions and sizes of the first display area DA1 and the second display area DA2 are not limited thereto. A boundary line BNL may be located between the first display area DA1 and the second display area DA2 and distinguish between the first display area DA1 and the second display area DA2. The boundary line BNL may extend in the y-axis direction while passing through the center of the display area DA.

The scan driver 800 may include first to fourth scan drivers 801, 802, 803 and 804. For example, each of the first to fourth scan drivers 801, 802, 803 and 804 may include a gate driver 810 and an emission control driver 820. In another example, each of the first to fourth scan drivers 801, 802, 803 and 804 may include one of the gate driver 810 and the emission control driver 820. The scan driver 800 may be electrically connected to scan lines SL through the connection lines CNL. The scan lines SL may correspond to the gate lines GL or the emission control lines EML of FIG. 2. The connection lines CNL may include first to fourth connection lines CNL1, CNL2, CNL3 and CNL4.

The first scan driver 801 may be located at the left edge of the first display area DA1. The left edge of the first display area DA1 may be the left edge of the entire display area DA. The first connection line CNL1 may be closer to the left edge of the first display area DA1 than the first scan driver 801. The first connection line CNL1 may be electrically connected to the left ends of the scan lines SL of the first display area DA1. Accordingly, the first scan driver 801 may supply scan signals to the scan lines SL of the first display area DA1 through the first connection line CNL1.

The second scan driver 802 may be located at the right edge of the first display area DA1. The second connection line CNL2 may be closer to the right edge of the first display area DA1 than the second scan driver 802. The right edge of the first display area DA1 may correspond to the boundary line BNL. The second connection line CNL2 may be electrically connected to the right ends of the scan lines SL of the first display area DA1. Accordingly, the second scan driver 802 may supply scan signals to the scan lines SL of the first display area DA1 through the second connection line CNL2.

The third scan driver 803 may be located at the left edge of the second display area DA2. The third connection line CNL3 may be closer to the left edge of the second display area DA2 than the third scan driver 803. The left edge of the second display area DA2 may correspond to the boundary line BNL. The boundary line BNL may be disposed between the second connection line CNL2 and the third connection line CNL3. The third connection line CNL3 may be electrically connected to the left ends of the scan lines SL of the second display area DA2. Accordingly, the third scan driver 803 may supply scan signals to the scan lines SL of the second display area DA2 through the third connection line CNL3.

The fourth scan driver 804 may be located at the right edge of the second display area DA2. The right edge of the second display area DA2 may be the right edge of the entire display area DA. The fourth connection line CNL4 may be closer to the right edge of the second display area DA2 than the fourth scan driver 804. The fourth connection line CNL4 may be electrically connected to the right ends of the scan lines SL of the second display area DA2. Accordingly, the fourth scan driver 804 may supply scan signals to the scan lines SL of the second display area DA2 through the fourth connection line CNL4.

Accordingly, the display device 10 includes the first and second scan drivers 801 and 802 that are located at the both edges of the first display area DA1 to supply scan signals, and the third and fourth scan drivers 803 and 804 located at the both edges of the second display area DA2 to supply scan signals, such that the load for outputting the scan signals by the display device 10 may be reduced compared to a display device in which scan drivers are disposed on the both edges of the entire display area. In some aspects, the scan driver 800 is disposed in the first display area DA1 and the second display area DA2, thereby reducing the area of the non-display area NDA.

Figure 4:
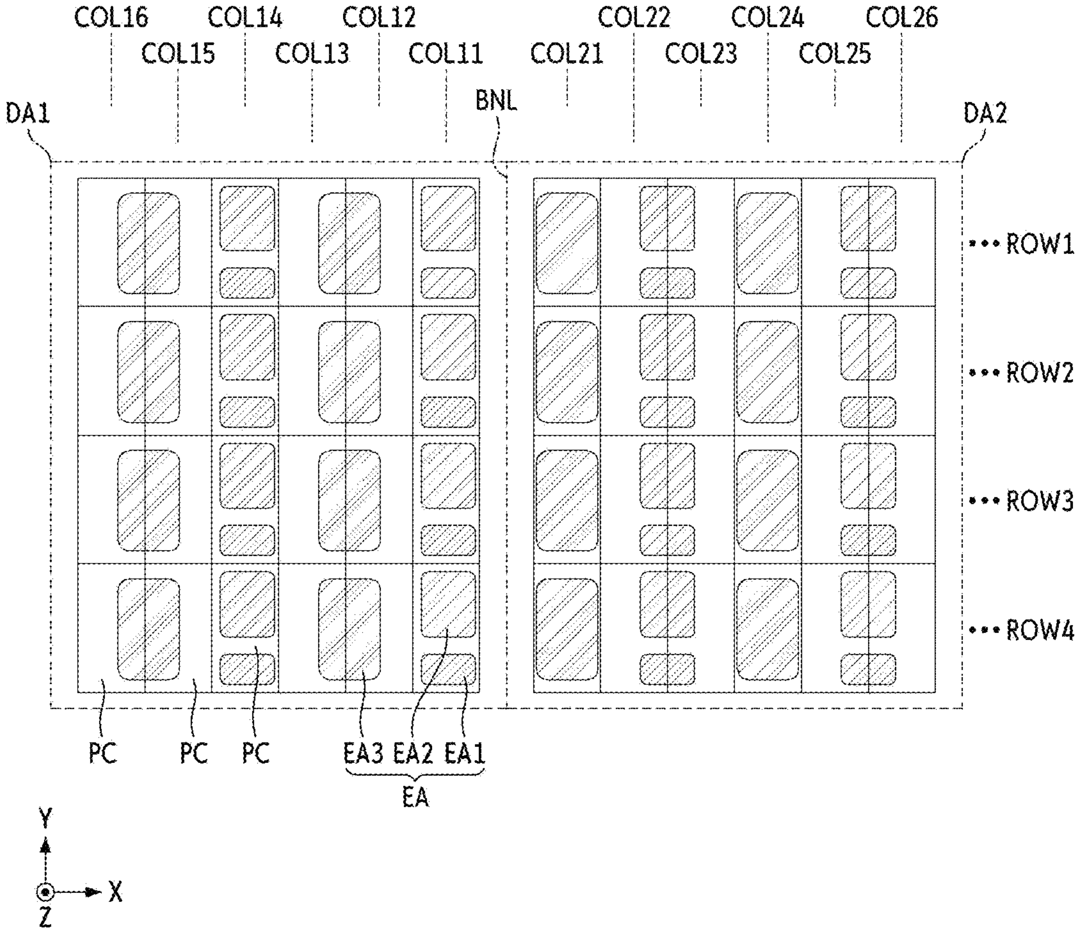
FIG. 4 is a view illustrating emission areas and pixel circuits in a display device according to an embodiment.

FIG. 4 is a view illustrating emission areas and pixel circuits in a display device according to an embodiment. FIG. 4 schematically illustrates a plurality of rows and columns. It should be noted that the display device 10 may include more rows and columns than those illustrated in FIG. 4.

Referring to FIG. 4, each of the first display area DA1 and the second display area DA2 may include emission areas EA and pixel circuits PC. A plurality of pixel circuits PC may be arranged in the x-axis direction along the first to fourth rows ROW1, ROW2, ROW3 and ROW4. The pixel circuits PC of the first display area DA1 may be arranged in the y-axis direction along the $11^{th}$ to $16^{th}$ columns COL11, COL12, COL13, COL14, COL15, and COL16. The pixel circuits PC of the second display area DA2 may be arranged in the y-axis direction along the $21^{st}$ to $26^{th}$ columns COL21, COL22, COL23, COL24, COL25, and COL26. The $11^{th}$ column COL11 of the first display area DA1 and the $21^{st}$ column COL21 of the second display area DA2 may be closest to the boundary line BNL.

The emission areas EA may include first to third emission areas EA1, EA2 and EA3. The pixel circuits PC may be associated with the emission areas EA, respectively. A single unit pixel may include a first emission area EA1, a second emission area EA2 and a third emission area EA3 to represent a black-and-white or grayscale image. It should be understood, however, that the configuration of the unit pixel is not limited thereto.

For example, the first and second emission areas EA1 and EA2 of the first display area DA1 may overlap with the pixel circuits PC arranged in the $11^{th}$ and $14^{th}$ columns COL11 and COL14. The third emission areas EA3 of the first display area DA1 may overlap with the pixel circuits PC arranged in the $12^{th}$, $13^{th}$, $15^{th}$ and $16^{th}$ columns COL12, COL13, COL15, and COL16. The first and second emission areas EA1 and EA2 of the second display area DA2 may overlap with the pixel circuits PC arranged in the $22^{nd}$, $23^{rd}$, $25^{th}$ and $26^{th}$ columns COL22, COL23, COL25 and COL26. The third emission areas EA3 of the second display area DA2 may overlap with the pixel circuits PC arranged in the $21^{st}$ and $24^{th}$ columns COL21 and COL24. The pixel circuits PC and the emission areas EA may overlap each other in other ways than the way illustrated in FIG. 4.

Figure 5:
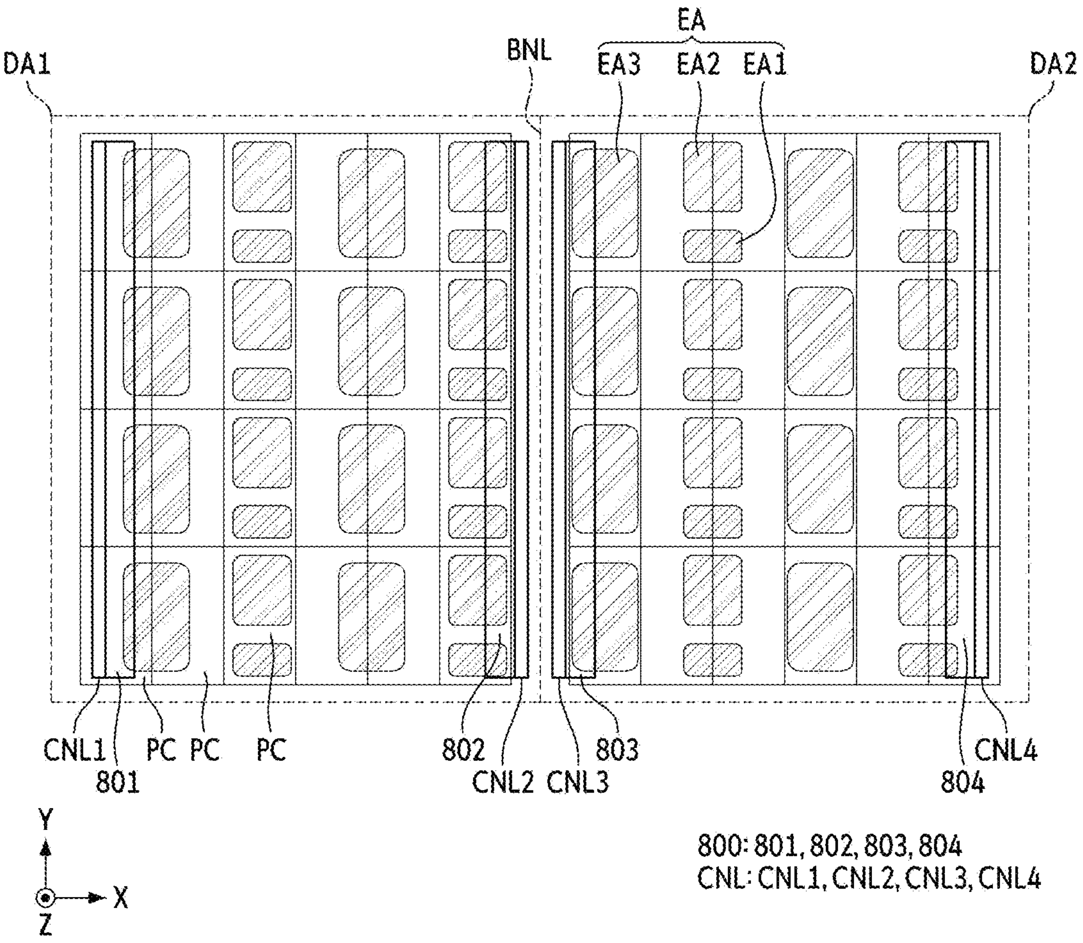
FIG. 5 is a view illustrating emission areas, pixel circuits, scan drivers, and connection lines in a display device according to an embodiment.

FIG. 5 is a view illustrating emission areas, pixel circuits, scan drivers, and connection lines in a display device according to an embodiment. FIG. 5 is a view where FIG. 3 is superimposed on FIG. 4. The same elements as those described herein will be briefly described or omitted.

Referring to FIG. 5, the first and second scan drivers 801 and 802 of the first display area DA1 may overlap with the pixel circuits PC of the first display area DA1 in a z-axis direction or the thickness direction. The first and second scan drivers 801 and 802 may overlap with the emission areas EA of the first display area DA1. For example, a first connection line CNL1 may overlap with the pixel circuits PC arranged at the left edge of the first display area DA1. In another example, the first connection line CNL1 may be disposed between the left boundary of the first display area DA1 and the pixel circuits PC, such that the first connection line CNL1 does not overlap with the pixel circuits PC. The second connection line CNL2 may be disposed between the boundary line BNL and the pixel circuits PC in the $11^{th}$ column COL11, such that the second connection line CNL2 does not overlap with the pixel circuits PC. The second connection line CNL2 may not overlap with the emission areas EA of the first display area DA1.

The third and fourth scan drivers 803 and 804 of the second display area DA2 may overlap with the pixel circuits PC of the second display area DA2 in the z-axis direction or the thickness direction. The third and fourth scan drivers 803 and 804 may overlap with the emission areas EA of the second display area DA2. The third connection line CNL3 may be disposed between the boundary line BNL and the pixel circuits PC in the $21^{st}$ column COL21, such that the third connection line CNL3 does not overlap with the pixel circuits PC. The third connection line CNL3 may not overlap with the emission areas EA of the second display area DA2. For example, the fourth connection line CNL4 may overlap with the pixel circuits PC arranged at the right edge of the second display area DA2. In another example, the fourth connection line CNL4 may be disposed between the right boundary of the second display area DA2 and the pixel circuits PC, such that the fourth connection line CNL4 does not overlap with the pixel circuits PC.

Accordingly, the display device 10 includes the first and second scan drivers 801 and 802 that are located at the both edges of the first display area DA1 to supply scan signals, and the third and fourth scan drivers 803 and 804 located at the both edges of the second display area DA2 to supply scan signals, such that the load for outputting the scan signals by the display device 10 may be reduced compared to a display device in which scan drivers are disposed on the both edges of the entire display area. In some aspects, the scan driver 800 is disposed in the first display area DA1 and the second display area DA2, thereby reducing the area of the non-display area NDA.

Figure 6:
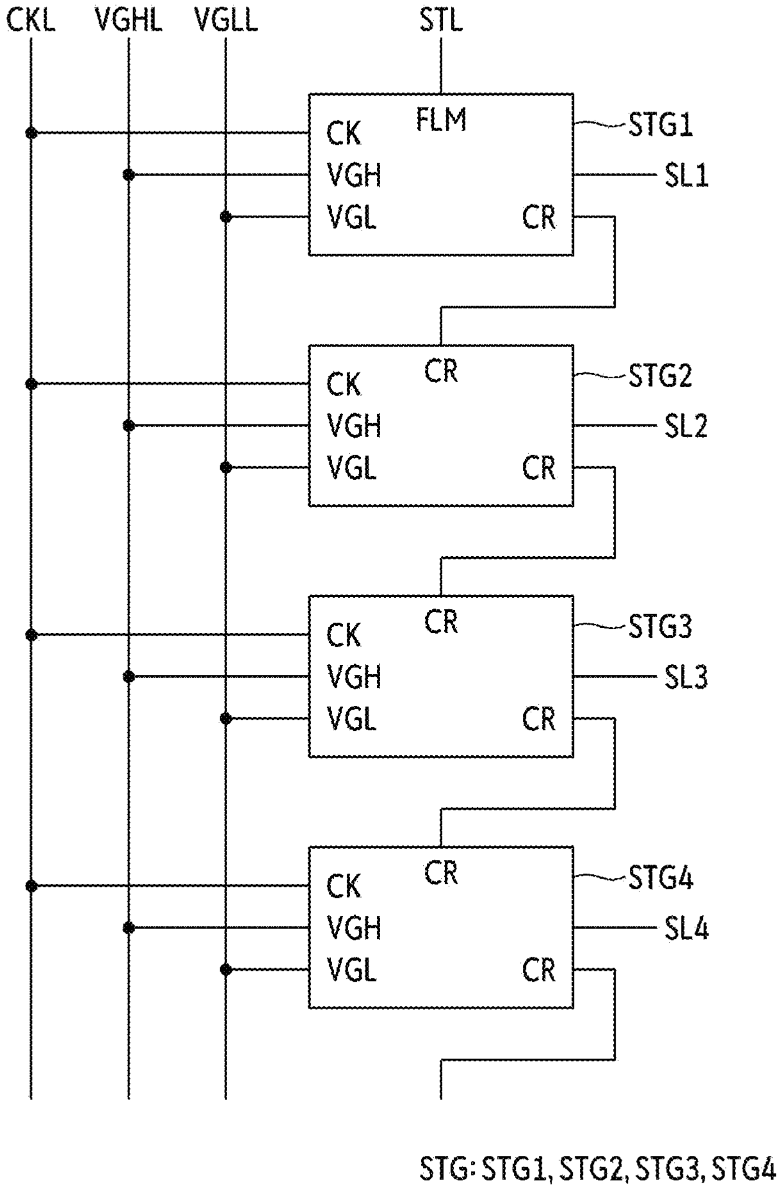
FIG. 6 is a block diagram illustrating a scan driver of a display device according to an embodiment of the present disclosure.

FIG. 6 is a block diagram illustrating a scan driver of a display device according to an embodiment of the present disclosure.

Referring to FIG. 6, the scan driver 800 may include a plurality of stages STG. A clock line CKL may provide a clock signal CK to the stages STG. A gate-high voltage line VGHL may provide a gate-high voltage VGH to the stages STG, and a gate-low voltage line VGLL may provide a gate-low voltage VGL to the stages STG. The stages STG may generate scan signals and supply them to the scan signals SL. The stages STG may include first to fourth stages STG1, STG2, STG3 and STG4.

The first stage STG1 may be connected to a start line STL and may receive a start signal FLM. The first stage STG1 may receive a clock signal CK, a gate-high voltage VGH, and a gate-low voltage VGL and supply a first scan signal to a first scan line SL1.

The second stage STG2 may receive a carry signal CR from the first stage STG1. The second stage STG2 may receive a clock signal CK, a gate-high voltage VGH, and a gate-low voltage VGL and supply a second scan signal to a second scan line SL2.

The third stage STG3 may receive a carry signal CR from the second stage STG2. The third stage STG3 may receive a clock signal CK, a gate-high voltage VGH, and a gate-low voltage VGL and supply a third scan signal to a third scan line SL3.

The fourth stage STG4 may receive a carry signal CR from the third stage STG3. The fourth stage STG4 may receive a clock signal CK, a gate-high voltage VGH, and a gate-low voltage VGL and supply a fourth scan signal to a fourth scan line SL4.

Figure 7:
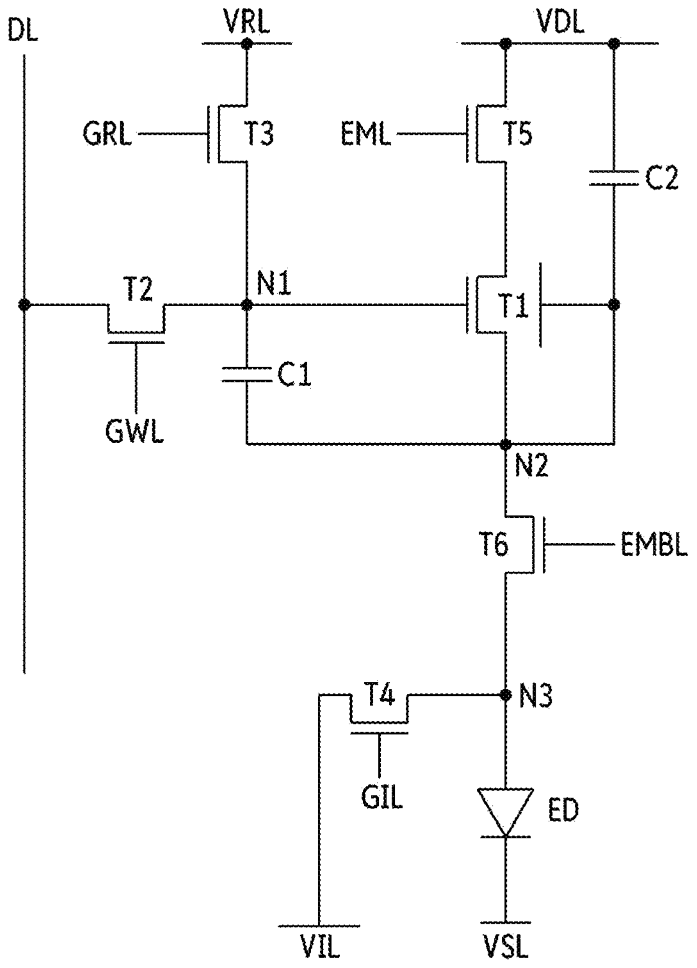
FIG. 7 is a circuit diagram illustrating an example of a pixel in a display device according to an embodiment of the present disclosure.

FIG. 7 is a circuit diagram illustrating an example of a pixel in a display device according to an embodiment of the present disclosure.

Referring to FIG. 7, the first and second display area DA1 and DA2 may include a plurality of pixels SP. Each of the plurality of pixels SP may be connected to a first gate line GWL, a second gate line GRL, a third gate line GIL, a first emission control line EML, a second emission control line EMBL, a data line DL, a reference voltage line VRL, a supply voltage line VDL, an initialization voltage line VIL, and a low-level voltage line VSL.

The pixel SP may include a pixel circuit PC and the light-emitting element ED. The pixel driver circuit PC may include first to sixth transistors T1, T2, T3, T4, T5 and T6, and first and second capacitors C1 and C2.

The first transistor T1 may include a gate electrode, a drain electrode and a source electrode. The first transistor T1 may control a drain-source current Ids (or a driving current) based on a data voltage applied to the gate electrode. The driving current Ids flowing through the channel of the first transistor T1 may be proportional to the square of the difference between the threshold voltage Vth and the voltage Vgs between the gate electrode and the source electrode of the first transistor T1 ($Ids=k'\times(Vgs-Vth)^2$), where k denotes a proportional coefficient determined by the structure and physical properties of the first transistor T1, Vgs denotes the gate-source voltage of the first transistor T1, and Vth denotes the threshold voltage of the first transistor T1. The gate electrode of the first transistor T1 may be connected to a first node N1, the drain electrode of the first transistor T1 may be connected to the source electrode of the fifth transistor T5, and the source electrode of the first transistor T1 may be connected to a second node N2. The first transistor T1 may further include a bias electrode electrically connected to the second node N2.

The light-emitting element ED may receive the driving current Ids to emit light. The amount or the luminance of the light emitted from the light-emitting element ED may be proportional to the magnitude of the driving current Ids.

The light-emitting element ED may be an organic light-emitting diode including a first electrode, a second electrode, and an organic light-emitting layer disposed between the first electrode and the second electrode. Alternatively, the light-emitting element ED may be an inorganic light-emitting element including a first electrode, a second electrode, and an inorganic semiconductor disposed between the first electrode and the second electrode. Alternatively, the light-emitting element ED may be a quantum-dot light-emitting element including a first electrode, a second electrode, and a quantum-dot emissive layer between the first electrode and the second electrode. As another example, the light-emitting element ED may be a micro light-emitting diode.

The first electrode of the light-emitting element ED may be electrically connected to a third node N3. The first electrode of the light-emitting element ED may be electrically connected to the drain electrode of the fourth transistor T4 and the source electrode of the sixth transistor T6 through the third node N3. The second electrode of the light-emitting element ED may be electrically connected to the low-level voltage line VSL and may receive a low-level voltage from the low-level voltage line VSL.

The second transistor T2 may be turned on by a first gate signal of the first gate line GWL to electrically connect the data line DL with the first node N1, which is the gate electrode of the first transistor T1. The second transistor T2 may be turned on in response to the first gate signal to apply data voltage to the first node N1. The gate electrode of the second transistor T2 may be connected to the first gate line GWL, the drain electrode of the second transistor T2 may be connected to the data line DL, and the source electrode of the second transistor T2 may be connected to the first node N1.

The third transistor T3 may be turned on by the second gate signal of the second gate line GRL to electrically connect the reference voltage line VRL with the first node N1 which is the gate electrode of the first transistor T1. The third transistor T3 may be turned on in response to the second gate signal to apply a reference voltage to the first node N1. A gate electrode of the third transistor T3 may be connected to the second gate line GRL, a drain electrode of the third transistor T3 may be connected to a reference voltage line VRL, and a source electrode of the third transistor T3 may be connected to the first node N1.

The fourth transistor T4 may be turned on by a third gate signal of the third gate line GIL to electrically connect the third node N3, which is the first electrode of the light-emitting element ED with the initialization voltage line VIL. As the fourth transistor T4 is turned on based on the third gate signal, the first electrode of the light-emitting element ED may be discharged to the initialization voltage. The gate electrode of the fourth transistor T4 may be connected to the third gate line GIL, the drain electrode of the fourth transistor T4 may be connected to the third node N3, and the source electrode of the fourth transistor T4 may be connected to the initialization voltage line VIL.

The fifth transistor T5 may be turned on by a first emission signal of the first emission control line EML1 and may electrically connect the supply voltage line VDL with the drain electrode of the first transistor T1. A gate electrode of the fifth transistor ST5 may be connected to the first emission control line EML1, a drain electrode of the fifth transistor ST5 may be connected to the supply voltage line VDL, and a second electrode of the fifth transistor ST5 may be connected to the drain electrode of the first transistor T1.

The sixth transistor T6 may be turned on by a second emission signal of a second emission control line EML2 to electrically connect the second node N2 which is the source electrode of the first transistor T1 with the third node N3 which is the first electrode of the light-emitting element ED. The second emission signal may be the inverted signal of the first emission signal, but embodiments of the present disclosure are not limited thereto. A gate electrode of the sixth transistor T6 may be connected to the second emission control line EML2, a drain electrode of the sixth transistor T6 may be connected to the second node N2, and a source electrode of the sixth transistor T6 may be connected to the third node N3.

Each of the first to sixth transistors T1, T2, T3, T4, T5 and T6 may include an oxide-based active layer. The first to sixth transistors T1, T2, T3, T4, T5 and T6 may have a coplanar structure in which a gate electrode is located at the top. The first to sixth transistors T1, T2, T3, T4, T5 and T6 may be n-type transistors and may output electric current introduced into the drain electrode via the source electrode based on a gate-high voltage applied to the gate electrode. The oxide-based active layer may have a relatively small S-factor, may increase the constant current driving area in the low gray level region, and can improve low gray level expression.

In another example, at least one of the first to sixth transistors T1, T2, T3, T4, T5 and T6 may include an active layer formed of low-temperature polycrystalline silicon (LTPS). The first to sixth transistors T1, T2, T3, T4, T5 and T6 may be p-type transistors and may output electric current introduced into the source electrode via the drain electrode based on a gate-low voltage applied to the gate electrode.

The first capacitor C1 may be electrically connected between the first node N1, which is the gate electrode of the first transistor T1, and the second node N2, which is the source electrode of the first transistor T1. For example, the first electrode of the first capacitor C1 may be electrically connected to the first node N1, the second electrode of the first capacitor C1 may be electrically connected to the second node N2, such that a potential difference between the gate electrode and the source electrode of the first transistor T1 can be maintained.

The second capacitor C2 may be electrically connected between the supply voltage line VDL and the second node N2, which is the source electrode of the first transistor T1. For example, the first electrode of the second capacitor C2 may be electrically connected to the supply voltage line VDL, the second electrode of the second capacitor C2 may be electrically connected to the second node N2, such that a potential difference between the supply voltage line VDL and the source electrode of the first transistor T1 can be maintained.

Figure 8:
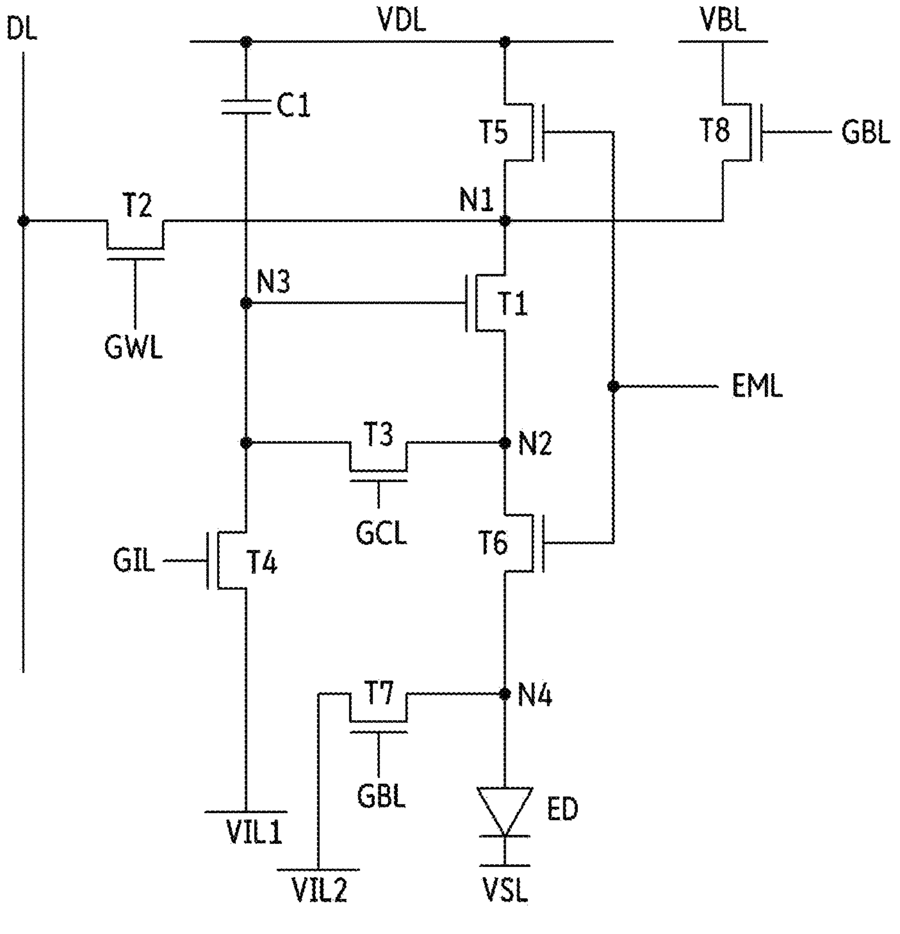
FIG. 8 is a circuit diagram illustrating another example of a pixel in a display device according to an embodiment of the present disclosure.

FIG. 8 is a circuit diagram illustrating another example of a pixel in a display device according to an embodiment of the present disclosure.

Referring to FIG. 8, first and second display area DA1 and DA2 may include a plurality of pixels SP. Each of the plurality of pixels SP may be connected to a first gate line GWL, a second gate line GCL, a third gate line GIL, a fourth gate line GBL, an emission control line EML, a data line DL, a supply voltage line VDL, a first initialization voltage line VIL1, a second initialization voltage line VIL2, a bias voltage line VBL, and a low-level voltage line VSL.

The pixel SP may include a pixel circuit PC and the light-emitting element ED. The pixel circuit PC may include first to eighth transistors T1, T2, T3, T4, T5, T6, T7 and T8 and a capacitor C1.

The first transistor T1 may control a driving current supplied to the light-emitting element ED. The first transistor T1 may include a gate electrode, a first electrode, and a second electrode. The gate electrode of the first transistor T1 may be connected to a third node N3, the first electrode of the first transistor T1 may be connected to a first node N1, and the second electrode of the first transistor T1 may be connected to a second node N2. For example, the first electrode of the first transistor T1 may be the drain electrode while the second electrode may be the source electrode. It is, however, to be understood that embodiments of the present disclosure are not limited thereto.

The first transistor T1 may control the drain-source current Ids (hereinafter, referred to as "driving current") according to the data voltage applied to the gate electrode. The driving current Ids flowing through the channel of the first transistor T1 may be proportional to the square of the difference between the threshold voltage Vth and the voltage Vgs between the gate electrode and the source electrode of the first transistor T1 ($Ids=k'\times(Vgs-Vth)^2$), where k denotes a proportional coefficient determined by the structure and physical properties of the first transistor T1, Vgs denotes the gate-source voltage of the first transistor T1, and Vth denotes the threshold voltage of the first transistor T1.

The light-emitting element ED may receive the driving current Ids to emit light. The amount or the luminance of the light emitted from the light-emitting element ED may be proportional to the magnitude of the driving current Ids. The light-emitting element ED may include a first electrode, a second electrode, and an emissive layer disposed between the first electrode and the second electrode. The first electrode of the light-emitting element ED may be connected to a fourth node N4. The first electrode of the light-emitting element ED may be electrically connected to the second electrode of the sixth transistor T6 and the first electrode of the seventh transistor ST7 through the fourth node N4. The second electrode of the light-emitting element ED may be electrically connected to the low-level voltage line VSL and may receive a low-level voltage from the low-level voltage line VSL. For example, the first electrode of the light-emitting element ED may be an anode electrode or a pixel electrode, while the second electrode of the light-emitting element ED may be a cathode electrode or a common electrode. It is, however, to be understood that embodiments of the present disclosure are not limited thereto.

The second transistor T2 may be turned on by a first gate signal of the first gate line GWL to electrically connect the data line DL with the first node N1, which is the first electrode of the first transistor T1. The first gate line GWL may be a scan write line. The second transistor T2 may be turned on in response to the first gate signal to apply data voltage to the first node N1. The gate electrode of the second transistor T2 may be connected to the first gate line GWL, the first electrode of the second transistor T2 may be connected to the data line DL, and the second electrode of the second transistor T2 may be connected to the first node N1.

The third transistor T3 may be turned on by a second gate signal of the second gate line GCL and may electrically connect a second node N2 which is the second electrode of the first transistor T1 with a third node N3 which is the gate electrode of the first transistor T1. The gate electrode of the third transistor T3 may be connected to the second gate line GCL, the first electrode of the third transistor T3 may be connected to the second node N2, and the second electrode of the third transistor T3 may be connected to the third node N3.

The fourth transistor T4 may be turned on by a third gate signal of the third gate line GIL to electrically connect the third node N3 which is the gate electrode of the first transistor T1 with the first initialization voltage line VIL1. As the fourth transistor T4 is turned on based on the third gate signal, the gate electrode of the first transistor T1 may be initialized to the first initialization voltage. The gate electrode of the fourth transistor T4 may be connected to the third gate line GIL, the first electrode of the fourth transistor T4 may be connected to the third node N3, and the second electrode of the fourth transistor T4 may be connected to the first initialization voltage line VIL1.

The fifth transistor ST5 may be turned on by an emission signal of the emission control line EML and may electrically connect the driving voltage line VDL with the first node N1 which is the first electrode of the first transistor T1. A gate electrode of the fifth transistor ST5 may be connected to the emission control line EML, a first electrode of the fifth transistor ST5 may be connected to the supply voltage line VDL, and a second electrode of the fifth transistor ST5 may be connected to the first node N1.

The sixth transistor T6 may be turned on by the emission signal of the emission control line EML to electrically connect the second node N2 which is the second electrode of the first transistor T1 with the fourth node N4 which is the first electrode of the light-emitting element ED. The gate electrode of the sixth transistor T6 may be connected to the emission control line EML, the first electrode of the sixth transistor T6 may be connected to the second node N2, and the second electrode of the sixth transistor T6 may be connected to the fourth node N4.

The seventh transistor T7 may be turned on by a fourth gate signal of the fourth gate line GBL to electrically connect the second initialization voltage line VIL2 with the fourth node N4 which is the first electrode of the light-emitting element ED. As the seventh transistor T7 is turned on based on the fourth gate signal, the first electrode of the light-emitting element ED may be initialized to the second initialization voltage. The second initialization voltage of the second initialization voltage line VIL2 may be different from the first initialization voltage of the first initialization voltage line VIL1. In another example, the second initialization voltage may be equal to the first initialization voltage. The gate electrode of the seventh transistor T7 may be connected to the fourth gate line GBL, the first electrode of the seventh transistor T7 may be connected to the fourth node N4, and the second electrode of the seventh transistor T7 may be connected to the second initialization voltage line VIL2.

The eighth transistor T8 may be turned on by the fourth gate signal of the fourth gate line GBL to electrically connect the bias voltage line VBL with the first node N1 which is the first electrode of the first transistor T1. The gate electrode of the eighth transistor T8 may be connected to the fourth gate line GBL, the first electrode of the eighth transistor T8 may be connected to the bias voltage line VBL, and the second electrode of the eighth transistor T8 may be connected to the first node N1.

The first to eighth transistors T1, T2, T3, T4, T5, T6, T7 and T8 may include an oxide-based semiconductor region. For example, each of the first to eighth transistors T1, T2, T3, T4, T5, T6, T7 and T8 may have a coplanar structure in which a gate electrode is disposed above an oxide-based semiconductor region. A transistor having such a coplanar structure has excellent leakage current characteristics and supports low-frequency driving, thereby reducing power consumption. Accordingly, the display device 10 includes the first to eighth transistors T1, T2, T3, T4, T5, T6, T7 and T8 having good leakage current characteristics, such that the display device 10 may prevent leakage current from flowing inside the pixels and maintain the voltage inside the pixels stably.

The first to eighth transistors T1, T2, T3, T4, T5, T6, T7 and T8 may be n-type transistors. For example, each of the first to eighth transistors T1, T2, T3, T4, T5, T6, T7 and T8 may output a current flowing into the first electrode to the second electrode based on a gate-high voltage applied to the gate electrode.

In another example, at least one of the first to eighth transistors T1, T2, T3, T4, T5, T6, T7 and T8 may include a silicon-based semiconductor region. For example, at least one of the first to eighth transistors T1, T2, T3, T4, T5, T6, T7 and T8 may include a semiconductor region formed of low-temperature polycrystalline silicon (LTPS). The semiconductor region formed of low-temperature polycrystalline silicon may have a high electron mobility and excellent turn-on characteristics. At least one of the first to eighth transistors T1, T2, T3, T4, T5, T6, T7 and T8 may be a p-type transistor. The p-type transistor may output the current flowing into the first electrode to the second electrode based on the gate-low voltage applied to the gate electrode.

The capacitor C1 may be connected between the third node N3 which is the gate electrode of the first transistor T1 and the supply voltage line VDL. For example, the first capacitor electrode of the capacitor C1 is connected to the third node N3, and the second capacitor electrode of the capacitor C1 is connected to the supply voltage line VDL, such that the potential difference between the supply voltage line VDL and the gate electrode of the first transistor T1 can be held.

In another example, the display device 10 may include a pixel circuit different from that illustrated in the circuit diagrams of FIGS. 7 and 8.

Figure 9:
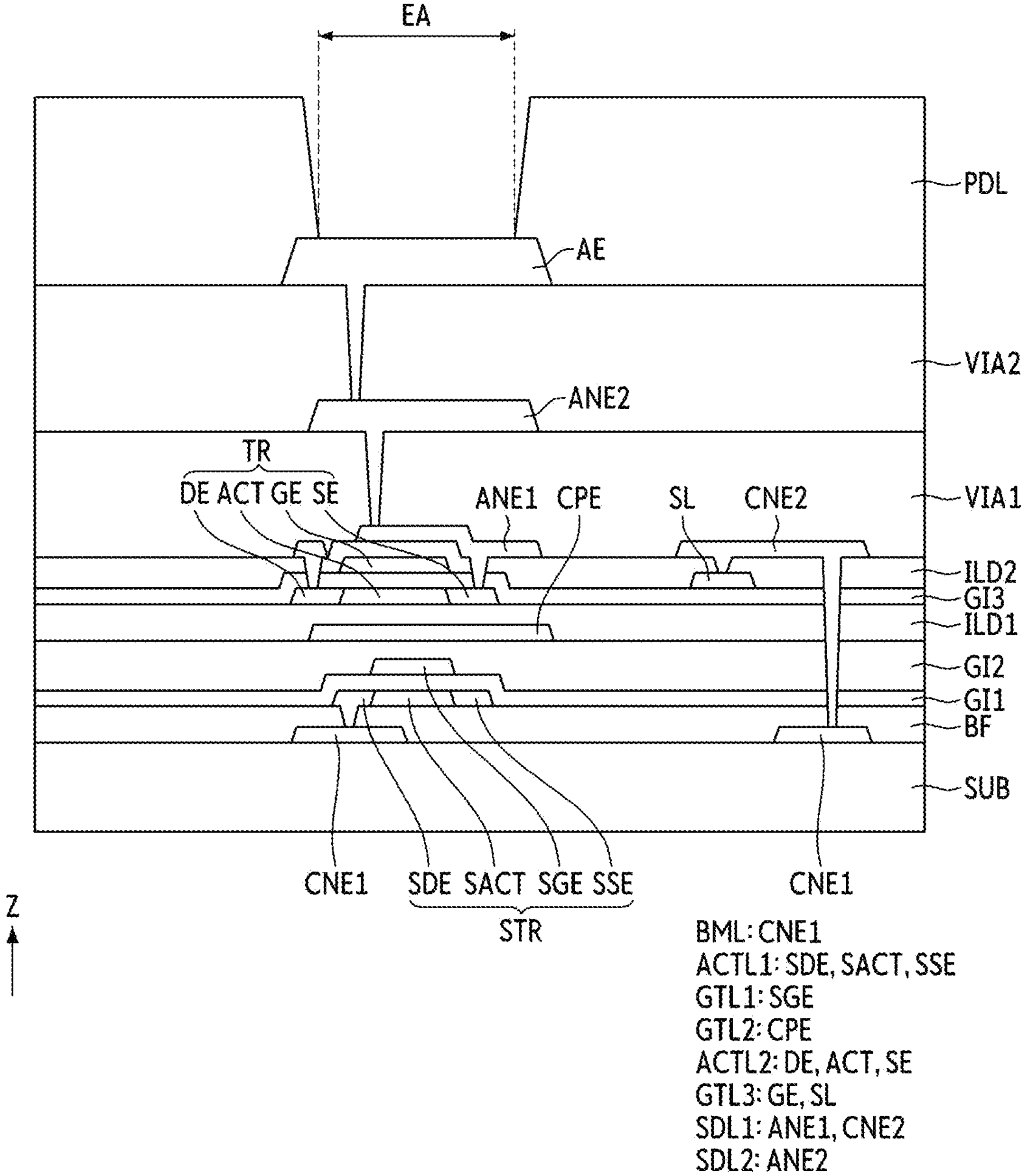
FIG. 9 is a cross-sectional view illustrating a display device according to an embodiment of the present disclosure.

FIG. 9 is a cross-sectional view illustrating a display device according to an embodiment of the present disclosure.

Referring to FIG. 9, a display panel 100 may include a substrate SUB, a metal layer BML, a buffer layer BF, a first active layer ACTL1, a first gate insulator GI1, a first gate layer GTL1, a second gate insulator GI2, a second gate layer GTL2, a first interlayer dielectric layer ILD1, a second active layer ACTL2, a third gate insulator GI3, a third gate layer GTL3, a second interlayer dielectric layer ILD2, a first source metal layer SDL1, a first via layer VIA1, a second source metal layer SDL2, a second via layer VIA2, a pixel electrode AE, and pixel-defining layer PDL.

The substrate SUB may be a base substrate or a base member. The substrate SUB may be a flexible substrate that can be bent, folded, or rolled. For example, the substrate SUB may include, but is not limited to, a polymer resin such as, for example, polyimide PI. In another example, the substrate SUB may include a glass material or a metal material.

The metal layer BML may be disposed on the substrate SUB. The metal layer BML may include a first connection electrode CNE1. The first connection electrode CNE1 may electrically connect a second electrode SDE of a scan transistor STR with a second connection electrode CNE2.

The buffer layer BF may be disposed on the metal layer BML. For example, the buffer layer BF may include an inorganic film that can prevent the permeation of air or moisture. For example, the buffer layer BF may include a plurality of inorganic films stacked on one another alternately.

The first active layer ACTL1 may be disposed on the buffer layer BF. The first active layer ACTL1 may include a silicon-based material. For example, the first active layer ACTL1 may be formed of low-temperature polycrystalline silicon (LTPS). The first active layer ACTL1 may include a semiconductor region SACT, a first electrode SSE and the second electrode SDE of the scan transistor STR.

The scan transistor STR may be disposed in the display area DA to form a scan driver 800. Accordingly, each of the first to fourth scan drivers 801, 802, 803 and 804 may include a plurality of scan transistors STR disposed in the first active layer ACTL1 and the first gate layer GTL1. The scan transistor STR of the scan driver 800 may overlap with the transistor TR of the pixel SP in the z-axis direction or the thickness direction.

The first gate insulator GI1 may be disposed on the first active layer ACTL1. The first gate insulator GI1 may insulate the first active layer ACTL1 from the first gate layer GTL1.

The first gate layer GTL1 may be disposed on the first gate insulator GI1. The first gate layer GTL1 may include a gate electrode SGE of the scan transistor STR.

The second gate insulator GI2 may be disposed on the first gate layer GTL1. The second gate insulator GI2 may insulate the first gate layer GTL1 from the second gate layer GTL2.

The second gate layer GTL2 may be disposed on the second gate insulator GI2. The second gate layer GTL2 may include the capacitor electrode CPE. The capacitor electrode CPE may overlap with the gate electrode SGE of the scan transistor STR to form a capacitor.

The first interlayer dielectric layer ILD1 may be disposed on the second gate layer GTL2. The first interlayer dielectric layer ILD1 may insulate the second gate layer GTL2 from the second active layer ACTL2.

The second active layer ACTL2 may be disposed on the first interlayer dielectric layer ILD1. The second active layer ACTL2 may include an oxide-based material. The second active layer ACTL2 may include the semiconductor region ACT, the first electrode DE and the second electrode SE of the transistor TR.

The transistor TR may be disposed in the first display area DA1 and the second display area DA2 to form the pixel SP. The transistor TR may be one of the first to sixth transistors T1, T2, T3, T4, T5 and T6 of FIG. 7 or the first to eighth transistors T1, T2, T3, T4, T5, T6, T7 and T8. The transistor TR of the pixel SP and the scan transistor STR of the scan driver 800 may overlap each other in the z-axis direction or the thickness direction.

The third gate insulator GI3 may be disposed on the second active layer ACTL2. The third gate insulator GI2 may insulate the second active layer ACTL2 from the third gate layer GTL3.

The third gate layer GTL3 may be disposed on the third gate insulator GI3. The third gate layer GTL3 may include a gate electrode GE of the transistor TR and the scan line SL. The scan line SL may supply the scan signal received from the scan driver 800 to the gate electrode GE of the transistor TR.

The second interlayer dielectric layer ILD2 may be disposed on the third gate layer GTL3. The second interlayer dielectric layer ILD2 may insulate the third gate layer GTL3 from the first source metal layer SDL1.

The first source metal layer SDL1 may be disposed on the second interlayer dielectric layer ILD2. The first source metal layer SDL1 may include a first anode connection electrode ANE1 and a second connection electrode CNE2. The first anode connection electrode ANE1 may electrically connect the transistor TR of the pixel SP with the pixel electrode AE. The second connection electrode CNE2 may electrically connect the scan transistor STR of the scan driver 800 with the scan line SL. The second connection electrode CNE2 may correspond to the first to fourth connection lines CNL1, CNL2, CNL3, and CNL4 of FIGS. 3 and 5.

The first via layer VIA1 may be disposed on the first source metal layer SDL1. The first via layer VIA1 may insulate the first source metal layer SDL1 from the second source metal layer SDL2.

The second source metal layer SDL2 may be disposed on the first via layer VIA1. The second source metal layer SDL2 may include the second anode connection electrode ANE2. The first and second anode connection electrodes ANE1 and ANE2 may electrically connect the pixel electrode AE with the transistor TR.

The second via layer VIA2 may be disposed on the second source metal layer SDL2. The second via layer VIA2 may insulate the second source metal layer SDL2 from the pixel electrode AE.

The pixel electrode AE may be disposed on the second via layer VIA2. The pixel electrode AE may be exposed through the emission area EA. The pixel electrode AE may be the first electrode of the light-emitting element ED of FIG. 7 or 8.

The pixel-defining layer PDL may be disposed on the second via layer VIA2. The pixel-defining layer PDL may define a plurality of emission areas EA. The pixel-defining layer PDL may include an organic insulating material such as, for example, polyimide (PI).

Figure 10:
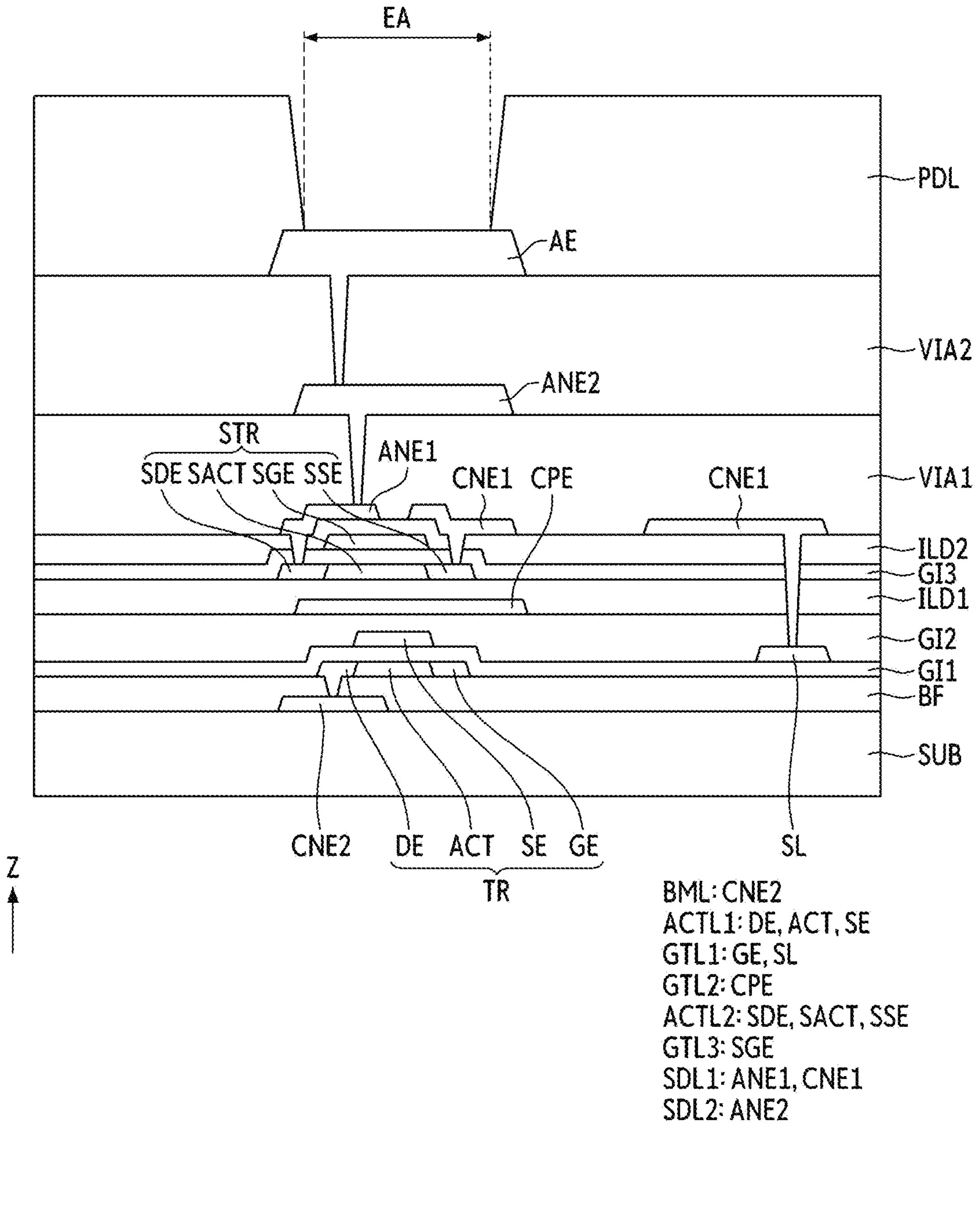
FIG. 10 is a cross-sectional view illustrating a display device according to another embodiment of the present disclosure.

FIG. 10 is a cross-sectional view illustrating a display device according to another embodiment of the present disclosure.

Referring to FIG. 10, a display panel 100 may include a substrate SUB, a metal layer BML, a buffer layer BF, a first active layer ACTL1, a first gate insulator GI1, a first gate layer GTL1, a second gate insulator GI2, a second gate layer GTL2, a first interlayer dielectric layer ILD1, a second active layer ACTL2, a third gate insulator GI3, a third gate layer GTL3, a second interlayer dielectric layer ILD2, a first source metal layer SDL1, a first via layer VIA1, a second source metal layer SDL2, a second via layer VIA2, a pixel electrode AE, and pixel-defining layer PDL.

The substrate SUB may be a base substrate or a base member. The substrate SUB may be a flexible substrate that can be bent, folded, or rolled. For example, the substrate SUB may include, but is not limited to, a polymer resin such as, for example, polyimide PI. In another example, the substrate SUB may include a glass material or a metal material.

The metal layer BML may be disposed on the substrate SUB. The metal layer BML may include the second connection electrode CNE2. The second connection CNE2 may be connected to the first electrode DE of the transistor TR.

The buffer layer BF may be disposed on the metal layer BML. For example, the buffer layer BF may include an inorganic film that can prevent the permeation of air or moisture. For example, the buffer layer BF may include a plurality of inorganic films stacked on one another alternately.

The first active layer ACTL1 may be disposed on the buffer layer BF. The first active layer ACTL1 may include a silicon-based material. For example, the first active layer ACTL1 may be formed of low-temperature polycrystalline silicon (LTPS). The first active layer ACTL1 may include the semiconductor region ACT, the first electrode DE and the second electrode SE of the transistor TR.

The transistor TR may be disposed in the first display area DA1 and the second display area DA2 to form the pixel SP. The transistor TR may be one of the first to sixth transistors T1, T2, T3, T4, T5 and T6 of FIG. 7 or the first to eighth transistors T1, T2, T3, T4, T5, T6, T7 and T8. The transistor TR of the pixel SP and the scan transistor STR of the scan driver 800 may overlap each other in the z-axis direction or the thickness direction.

The first gate insulator GI1 may be disposed on the first active layer ACTL1. The first gate insulator GI1 may insulate the first active layer ACTL1 from the first gate layer GTL1.

The first gate layer GTL1 may be disposed on the first gate insulator GI1. The first gate layer GTL1 may include the gate electrode GE of the transistor TR and the scan line SL. The scan line SL may supply the scan signal received from the scan driver 800 to the gate electrode GE of the transistor TR.

The second gate insulator GI2 may be disposed on the first gate layer GTL1. The second gate insulator GI2 may insulate the first gate layer GTL1 from the second gate layer GTL2.

The second gate layer GTL2 may be disposed on the second gate insulator GI2. The second gate layer GTL2 may include the capacitor electrode CPE. The capacitor electrode CPE may overlap with the gate electrode GE of the transistor TR to form a capacitor.

The first interlayer dielectric layer ILD1 may be disposed on the second gate layer GTL2. The first interlayer dielectric layer ILD1 may insulate the second gate layer GTL2 from the second active layer ACTL2.

The second active layer ACTL2 may be disposed on the first interlayer dielectric layer ILD1. The second active layer ACTL2 may include an oxide-based material. The second active layer ACTL2 may include a semiconductor region SACT, a first electrode SSE and the second electrode SDE of the scan transistor STR.

The scan transistor STR may be disposed in the display area DA to form a scan driver 800. Accordingly, each of the first to fourth scan drivers 801, 802, 803 and 804 may include a plurality of scan transistors STR disposed in the second active layer ACTL2 and the third gate layer GTL3. The scan transistor STR of the scan driver 800 may overlap with the transistor TR of the pixel SP in the z-axis direction or the thickness direction.

The third gate insulator GI3 may be disposed on the second active layer ACTL2. The third gate insulator GI2 may insulate the second active layer ACTL2 from the third gate layer GTL3.

The third gate layer GTL3 may be disposed on the third gate insulator GI3. The third gate layer GTL3 may include a gate electrode SGE of the scan transistor STR.

The second interlayer dielectric layer ILD2 may be disposed on the third gate layer GTL3. The second interlayer dielectric layer ILD2 may insulate the third gate layer GTL3 from the first source metal layer SDL1.

The first source metal layer SDL1 may be disposed on the second interlayer dielectric layer ILD2. The first source metal layer SDL1 may include a first anode connection electrode ANE1 and a first connection electrode CNE1. The first anode connection electrode ANE1 may electrically connect the transistor TR of the pixel SP with the pixel electrode AE. The first connection electrode CNE1 may electrically connect the scan transistor STR of the scan driver 800 with the scan line SL. The first connection electrode CNE1 may correspond to the first to fourth connection lines CNL1, CNL2, CNL3, and CNL4 of FIGS. 3 and 5.

The first via layer VIA1 may be disposed on the first source metal layer SDL1. The first via layer VIA1 may insulate the first source metal layer SDL1 from the second source metal layer SDL2.

The second source metal layer SDL2 may be disposed on the first via layer VIA1. The second source metal layer SDL2 may include the second anode connection electrode ANE2. The first and second anode connection electrodes ANE1 and ANE2 may electrically connect the pixel electrode AE with the transistor TR.

The second via layer VIA2 may be disposed on the second source metal layer SDL2. The second via layer VIA2 may insulate the second source metal layer SDL2 from the pixel electrode AE.

The pixel electrode AE may be disposed on the second via layer VIA2. The pixel electrode AE may be exposed through the emission area EA. The pixel electrode AE may be the first electrode of the light-emitting element ED of FIG. 7 or 8.

The pixel-defining layer PDL may be disposed on the second via layer VIA2. The pixel-defining layer PDL may define a plurality of emission areas EA. The pixel-defining layer PDL may include an organic insulating material such as, for example, polyimide (PI).

The display device according to one embodiment of the present disclosure can be applied to various electronic devices. The electronic device according to the one embodiment of the present disclosure includes the display device described above, and may further include modules or devices having additional functions in addition to the display device.

Aspects of the present disclosure should not be construed as being limited to the embodiments set forth herein. Rather, the example embodiments are provided such that this disclosure will be thorough and complete and will fully convey the concepts supported by aspects of the present disclosure to those skilled in the art.

While example aspects of the present disclosure have been particularly illustrated and described with reference to embodiments thereof, it will be understood by those of ordinary skill in the art that various changes in form and details may be made therein without departing from the spirit or scope of example embodiments described herein as defined by the following claims.

What is claimed is:

1. A display device comprising:

a first display area comprising:
- a pixel circuit; and
- a scan line configured to provide a scan signal to the pixel circuit of the first display area;

a second display area located at a side of the first display area and comprising:
- a pixel circuit; and
- a scan line configured to provide a scan signal to the pixel circuit of the second display area;

a first scan driver located at a first side edge of the first display area, wherein the first scan driver is overlapping with the pixel circuit of the first display area and electrically connected to a first side of the scan line of the first display area;

a second scan driver located at a second side edge of the first display area opposite to the first side edge of the first display area, wherein the second scan driver is overlapping with the pixel circuit of the first display area and electrically connected to a second side of the scan line of the first display area opposite to the first side of the scan line of the first display area;

a third scan driver located at a first side edge of the second display area, wherein the third scan driver is overlapping with the pixel circuit of the second display area and electrically connected to a first side of the scan line of the second display area; and a fourth scan driver located at a second side edge of the second display area opposite to the first side edge of the second display area, wherein the fourth scan driver is overlapping with the pixel circuit of the second display area and electrically connected to a second side of the scan line of the second display area opposite to the first side of the scan line of the second display area.

2. The display device of claim 1, further comprising:

a first connection line electrically connecting the first scan driver and the first side of the scan line of the first display area;

a second connection line electrically connecting the second scan driver and the second side of the scan line of the first display area;

a third connection line electrically connecting the third scan driver and the first side of the scan line of the second display area; and a fourth connection line electrically connecting the fourth scan driver and the second side of the scan line of the second display area.

3. The display device of claim 2, wherein:

the second connection line and the third connection line are disposed between the pixel circuit of the first display area and the pixel circuit of the second display area, and the second connection line and the third connection line do not overlap with the pixel circuit of the first display area and the pixel circuit of the second display area.

4. The display device of claim 2, wherein:

the first connection line is closer to the first side edge of the first display area than the first scan driver, the second connection line is closer to the second side edge of the first display area than the second scan driver, the third connection line is closer to the first side edge of the second display area than the third scan driver, and the fourth connection line is closer to the second side edge of the second display area than the fourth scan driver.

5. The display device of claim 2, further comprising:

a boundary line disposed between the first display area and the second display area and separating the first display area and the second display area from each other, wherein the pixel circuit of the first display area and the pixel circuit of the second display area are spaced apart from each other with the boundary line between the pixel circuit of the first display area and the pixel circuit of the second display area.

6. The display device of claim 5, wherein:

the second connection line is disposed between the boundary line and the pixel circuit of the first display area and does not overlap with the pixel circuit of the first display area, and the third connection line is disposed between the boundary line and the pixel circuit of the second display area and does not overlap with the pixel circuit of the second display area.

7. The display device of claim 1, wherein:

each of the first scan driver through the fourth scan driver comprises a scan transistor disposed in a first active layer comprising a first material, and the pixel circuit of the first display area and the pixel circuit of the second display area each comprise a transistor disposed in a second active layer comprising a second material different from the first material.

8. The display device of claim 7, further comprising:

a first active layer comprising a semiconductor region of the scan transistor of at least one of the first scan driver through the fourth scan driver;

a first gate layer disposed on the first active layer and comprising a gate electrode of the scan transistor of the at least one of the first scan driver through the fourth scan driver;

a second gate layer disposed on the first gate layer;

a second active layer disposed on the second gate layer and comprising a semiconductor region of the transistor of at least one of the pixel circuit of the first display area and the pixel circuit of the second display area; and a third gate layer disposed on the second active layer and comprising:

a gate electrode of the transistor of the at least one of the pixel circuit of the first display area and the pixel circuit of the second display area; and a scan line configured to provide a respective scan signal to the gate electrode.

9. The display device of claim 8, further comprising:

a first source metal layer disposed on the third gate layer, wherein the first source metal layer comprises a connection electrode that electrically connects the scan transistor of the at least one of the first scan driver through the fourth scan driver with the scan line comprised in the third gate layer.

10. The display device of claim 1, further comprising:

a first active layer comprising a semiconductor region of a transistor of the pixel circuit of the first display area or the pixel circuit of the second display area;

a first gate layer disposed on the first active layer and comprising:

a gate electrode of the transistor; and the scan line of the first display area or the scan line of the second display area;

a second gate layer disposed on the first gate layer;

a second active layer disposed on the second gate layer and comprising a semiconductor region of a scan transistor of each of the first scan driver through the fourth scan driver; and a third gate layer disposed on the second active layer and comprising a gate electrode of the scan transistor of each of the first scan driver through the fourth scan driver.

11. The display device of claim 10, further comprising:

a first source metal layer disposed on the third gate layer, wherein the first source metal layer comprises a connection electrode that electrically connects the scan transistor of each of the first scan driver through the fourth scan driver with the scan line of the first display area or the scan line of the second display area.

12. The display device of claim 1, wherein the pixel circuit of the first display area and the pixel circuit of the second display area each comprise:

a first transistor configured to supply a driving current to a light-emitting element;

a second transistor configured to supply a data voltage to a gate electrode of the first transistor;

a third transistor configured to supply a reference voltage to the gate electrode of the first transistor;

a fourth transistor configured to supply an initialization voltage to a first electrode of the light-emitting element;

a fifth transistor configured to supply a driving voltage to a first electrode of the first transistor; and a sixth transistor configured to electrically connect a second electrode of the first transistor and the first electrode of the light-emitting element.

13. The display device of claim 1, wherein the pixel circuit of the first display area and the pixel circuit of the second display area each comprise:

a first transistor configured to supply a driving current to a light-emitting element;

a second transistor configured to supply a data voltage to a first electrode of the first transistor;

a third transistor configured to electrically connect a second electrode of the first transistor and a gate electrode of the first transistor;

a fourth transistor configured to supply a first initialization voltage to the gate electrode of the first transistor;

a fifth transistor configured to supply a driving voltage to the first electrode of the first transistor;

a sixth transistor configured to electrically connect the second electrode of the first transistor and a first electrode of the light-emitting element; and a seventh transistor configured to supply a second initialization voltage to the first electrode of the light-emitting element.

14. A display device comprising:

a display area comprising:

pixel circuits, a first scan line extended in a first direction and configured to supply a scan signal to the pixel circuits, a second scan line extended in the first direction and configured to supply the scan signal to the pixel circuits, and a boundary line extended in a second direction intersecting the first direction and passing through a center of the display area;

a first display area located in the display area, at a first side of the boundary line, and comprising the first scan line;

a second display area located in the display area, at a second side of the boundary line opposite to the first side of the boundary line, and comprising the second scan line;

a first scan driver located at a first side edge of the display area and electrically connected to a first side of the first scan line in the first display area;

a second scan driver located at the first side of the boundary line and electrically connected to a second side of the first scan line in the first display area opposite to the first side of the first scan line in the first display area;

a third scan driver located at a second side of the boundary line opposite to the first side of the boundary line and electrically connected to a first side of the second scan line in the second display area; and a fourth scan driver located at a second side edge of the display area opposite to the first side edge of the display area and electrically connected to a second side of the second scan line in the second display area opposite to the first side of the second scan line in the second display area.

15. The display device of claim 14, wherein:

the first scan driver and the second scan driver overlap with a pixel circuit of the first display area, and the third scan driver and the fourth scan driver overlap with a pixel circuit of the second display area.

16. The display device of claim 14, further comprising:

a first connection line electrically connecting the first scan driver and the first side of the first scan line of the first display area;

a second connection line electrically connecting the second scan driver and the second side of the first scan line of the first display area;

a third connection line electrically connecting the third scan driver and the first side of the second scan line of the second display area; and a fourth connection line electrically connecting the fourth scan driver and the second side of the second scan line of the second display area.

17. The display device of claim 16, wherein:

the second connection line and the third connection line are disposed between a pixel circuit of the first display area and a pixel circuit of the second display area, and the second connection line and the third connection line do not overlap with the pixel circuit of the first display area and the pixel circuit of the second display area.

18. The display device of claim 16, wherein:

the first connection line is closer to the first side edge of the display area than the first scan driver, the second connection line is closer to the boundary line than the second scan driver, the third connection line is closer to the boundary line than the third scan driver, and the fourth connection line is closer to the second side edge of the display area than the fourth scan driver.

19. The display device of claim 14, wherein:

the first scan driver through the fourth scan driver each comprise a scan transistor disposed in a first active layer comprising a silicon-based material, and the pixel circuits each comprise a transistor disposed in a second active layer comprising an oxide-based material.

20. An electronic device comprising:

a display module configured to display an image; and a processor configured to transmit an image data signal to the display module, and wherein the display module comprising:

a first display area comprising:

a pixel circuit; and a scan line configured to provide a scan signal to the pixel circuit of the first display area;

a second display area located at a side of the first display area and comprising:

a pixel circuit; and a scan line configured to provide a scan signal to the pixel circuit of the second display area;

a first scan driver located at a first side edge of the first display area, wherein the first scan driver is overlapping with the pixel circuit of the first display area and electrically connected to a first side of the scan line of the first display area;

a second scan driver located at a second side edge of the first display area opposite to the first side edge of the first display area, wherein the second scan driver is overlapping with the pixel circuit of the first display area and electrically connected to a second side of the scan line of the first display area opposite to the first side of the scan line of the first display area;

a third scan driver located at a first side edge of the second display area, wherein the third scan driver is overlapping with the pixel circuit of the second display area and electrically connected to a first side of the scan line of the second display area; and a fourth scan driver located at a second side edge of the second display area opposite to the first side edge of the second display area, wherein the fourth scan driver is overlapping with the pixel circuit of the second display area and electrically connected to a second side of the scan line of the second display area opposite to the first side of the scan line of the second display area.

* * * * *